(12) United States Patent
Doughty

(10) Patent No.: US 7,546,304 B1
(45) Date of Patent: Jun. 9, 2009

(54) CONFIGURING KEYS FOR USE IN PROCESSING BUSINESS DATA

(75) Inventor: Steven G. Doughty, Plano, TX (US)

(73) Assignee: Computer Sciences Corporation, Austin, TX (US)

( * ) Notice: Subject to any disclaimer, the term of this patent is extended or adjusted under 35 U.S.C. 154(b) by 1925 days.

(21) Appl. No.: 09/699,037

(22) Filed: Oct. 27, 2000

Related U.S. Application Data

(60) Provisional application No. 60/162,603, filed on Oct. 29, 1999.

(51) Int. Cl.
G06F 7/00 (2006.01)
G06F 17/30 (2006.01)
G06F 12/00 (2006.01)
G06Q 40/00 (2006.01)

(52) U.S. Cl. .............................. 707/101; 707/3; 707/4; 707/6; 707/10; 707/104.1; 707/200; 707/201; 705/35; 705/38; 705/39; 705/40

(58) Field of Classification Search .................. 707/100, 707/138, 1–4, 9, 102, 101, 104.1, 200, 201; 707/6, 7, 10; 705/1, 5, 35, 44, 4, 6, 30, 135, 705/36, 38, 39, 40–45; 711/216, 217, 153; 715/513, 538; 709/215
See application file for complete search history.

(56) References Cited

U.S. PATENT DOCUMENTS 4,606,002 A * 8/1986 Waisman et al. ................ 707/3

(Continued)

FOREIGN PATENT DOCUMENTS

EP 0280773 A2 * 11/1987

(Continued)

OTHER PUBLICATIONS

American Banker; "Technology Terms"; Sep. 8, 1996; vol. 151, No. 175; pp. 1-11.*

(Continued)

*Primary Examiner*—Ella Colbert
(74) *Attorney, Agent, or Firm*—Meyertons, Hood, Kivlin, Kowert & Goetzel, P.C.; Eric B. Meyertons

(57) ABSTRACT

A system and method for configuring key definitions, key values, and key value search masks for locating processing parameter values in a Financial Service Organization (FSO) computer system. The FSO computer system may include one or more processing parameters. A processing parameter may have one key definition, one or more key values with one processing parameter value assigned to each key value, and one or more key value search masks. The FSO computer system may include a database for storing the key definitions, key values and their associated parameter values, and key value search masks. Configuring the key definitions may include providing a user interface for the selection of one or more data elements to be used as key elements in the key definition. The user interface may also allow the specification of a sequence in which the key elements will appear in the key definition. Configuring a key value and the processing parameter value associated with the key value may include providing a user interface for entering key element values that are combined to form the key value, and for entering the processing parameter values associated with the key value. The user interface may allow the user to enter wildcard values for the key element values. Configuring key value search masks may include providing a user interface for entering values in the search mask fields. A search mask may include a search mask field for each key element in the key definition. The user interface may allow the user to enter wildcard values and equal values in the search mask fields.

14 Claims, 10 Drawing Sheets

U.S. PATENT DOCUMENTS

| | | | |
|---|---|---|---|
| 4,878,167 A | 10/1989 | Kapulka et al. | |
| 5,099,422 A | 3/1992 | Foresman et al. | |
| 5,191,522 A | 3/1993 | Bosco et al. | |
| 5,201,044 A | 4/1993 | Frey, Jr. et al. | |
| 5,233,513 A | 8/1993 | Doyle | |
| 5,257,366 A | 10/1993 | Adair et al. | 707/4 |
| 5,386,566 A | 1/1995 | Hamanaka et al. | |
| 5,394,555 A | 2/1995 | Hunter et al. | |
| 5,434,994 A | 7/1995 | Shaheen et al. | |
| 5,455,947 A | 10/1995 | Suzuki et al. | |
| 5,483,632 A | 1/1996 | Kuwamoto et al. | |
| 5,495,608 A * | 2/1996 | Antoshenkov | 707/3 |
| 5,499,330 A | 3/1996 | Lucas et al. | |
| 5,504,674 A | 4/1996 | Chen et al. | |
| 5,523,942 A | 6/1996 | Tyler et al. | |
| 5,550,976 A | 8/1996 | Henderson et al. | |
| 5,553,218 A * | 9/1996 | Li et al. | 707/102 |
| 5,586,310 A | 12/1996 | Sharman | |
| 5,594,899 A * | 1/1997 | Knudsen et al. | 707/2 |
| 5,615,309 A * | 3/1997 | Bezek et al. | 706/50 |
| 5,638,508 A | 6/1997 | Kanai et al. | |
| 5,689,706 A | 11/1997 | Rao et al. | |
| 5,710,915 A | 1/1998 | McElhiney | 707/3 |
| 5,721,915 A | 2/1998 | Sockut et al. | |
| 5,732,397 A | 3/1998 | De Tore et al. | |
| 5,742,820 A | 4/1998 | Perlman | |
| 5,745,901 A | 4/1998 | Entner et al. | |
| 5,768,505 A | 6/1998 | Gilchrist et al. | |
| 5,768,506 A | 6/1998 | Randell | |
| 5,794,229 A * | 8/1998 | French et al. | 707/2 |
| 5,797,134 A | 8/1998 | McMillan et al. | |
| 5,832,481 A | 11/1998 | Sheffield | |
| 5,864,679 A | 1/1999 | Kanai et al. | |
| 5,867,494 A | 2/1999 | Krishnaswamy et al. | |
| 5,870,711 A | 2/1999 | Huffman | |
| 5,870,725 A | 2/1999 | Bellinger et al. | |
| 5,870,746 A | 2/1999 | Knutson et al. | 707/101 |
| 5,873,066 A | 2/1999 | Underwood et al. | |
| 5,881,379 A | 3/1999 | Beier et al. | 707/101 |
| 5,892,905 A * | 4/1999 | Brandt et al. | 713/201 |
| 5,907,848 A | 5/1999 | Zaiken et al. | |
| 5,909,683 A | 6/1999 | Miginiac et al. | |
| 5,930,759 A | 7/1999 | Moore et al. | |
| 5,933,816 A | 8/1999 | Zeanah et al. | |
| 5,937,189 A | 8/1999 | Branson et al. | |
| 5,940,809 A | 8/1999 | Musmanno et al. | |
| 5,950,169 A | 9/1999 | Borghesi et al. | |
| 5,950,192 A * | 9/1999 | Moore et al. | 707/3 |
| 5,956,719 A | 9/1999 | Kudo et al. | |
| 5,987,434 A | 11/1999 | Libman | |
| 5,991,733 A | 11/1999 | Aleia et al. | |
| 5,991,756 A | 11/1999 | Wu | |
| 5,995,971 A * | 11/1999 | Douceur et al. | 707/102 |
| 6,003,033 A | 12/1999 | Amano et al. | |
| 6,023,694 A * | 2/2000 | Kouchi et al. | 707/2 |
| 6,038,393 A | 3/2000 | Iyengar et al. | |
| 6,049,665 A | 4/2000 | Branson et al. | |
| 6,064,983 A | 5/2000 | Koehler | |
| 6,081,832 A | 6/2000 | Gilchrist et al. | |
| 6,092,049 A | 7/2000 | Chislenko et al. | |
| 6,105,007 A | 8/2000 | Norris | |
| 6,112,209 A | 8/2000 | Gusack | |
| 6,115,690 A | 9/2000 | Wong | |
| 6,134,582 A | 10/2000 | Kennedy | |
| 6,163,770 A | 12/2000 | Gamble et al. | |
| 6,182,121 B1 * | 1/2001 | Wlaschin | 709/215 |
| 6,185,540 B1 | 2/2001 | Schreitmueller et al. | |
| 6,202,070 B1 | 3/2001 | Nguyen et al. | 707/104.1 |
| 6,226,623 B1 | 5/2001 | Schein et al. | |
| 6,236,975 B1 | 5/2001 | Boe et al. | |
| 6,272,482 B1 | 8/2001 | McKee et al. | |
| 6,289,339 B1 | 9/2001 | Weber | |
| 6,289,355 B1 * | 9/2001 | Haderle et al. | 707/200 |
| 6,336,096 B1 | 1/2002 | Jernberg | |
| 6,341,287 B1 | 1/2002 | Sziklai et al. | 707/102 |
| 6,385,612 B1 | 5/2002 | Troisi | |
| 6,438,563 B1 | 8/2002 | Kawagoe | |
| 6,442,533 B1 | 8/2002 | Hinkle | 705/35 |
| 6,446,086 B1 | 9/2002 | Bartlett et al. | |
| 6,473,740 B2 * | 10/2002 | Cockrill et al. | 705/27 |
| 6,484,149 B1 * | 11/2002 | Jammes et al. | 705/26 |

FOREIGN PATENT DOCUMENTS

| | | | |
|---|---|---|---|
| EP | 0 280 773 | | 9/1988 |
| EP | 0 465 018 | | 1/1992 |
| EP | 747839 A1 | * | 12/1996 |
| EP | 0836779 B1 | * | 3/1999 |
| EP | 0 926 608 | | 6/1999 |

OTHER PUBLICATIONS

Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Aprl. 1995, 16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.

Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
International search report application No. PCT/ US 00 /18016, mailed Nov. 10, 2000.
International search report application No. PCT/US 00/18020 mailed Nov. 10, 2000.
"@ Fault A Commitment to Consistency," Computer Sciences Corporation, Copyright 2000, pp. 1-2.
Merlin, Jr., William F., "Colossus: What We Know Today," The Merlin Law Group, Aug. 2000, Tampa, FL, pp. 1-8.
Merlin, Jr., William F., "Collision Course With The Colossus Program: How To Deal With It," The Merlin Law Group, May 2000, Tampa, FL, pp. 1-17.
Merlin, Jr., William F., "Overcoming Allstate's Trade Secrets and Work-Product Objections," The Merlin Law Group, Mar. 2000, Tampa, FL, pp. 1-31.
Mead, Jay, Technical Communication, Aug. 1998, V. 45, N.3, p. 353-380.
Scopus Introduces World's Most Complete Call Center Solution for Financial Services; PR Newswire dated Nov. 5, 1997.
Borland, Russel; "Running Microsoft Outlook 97", Microsoft Press, 1997.
Juhl, Randy P., "The OTC Revolution"; Drugtopics.com; Mar. 3, 1997, pp. 1-9.

* cited by examiner

122 → DICTIONARY DATA ELEMENTS
124 → USEABLE IN KEYS?

120

| DICTIONARY DATA ELEMENTS | USEABLE IN KEYS? |
|---|---|
| A | NO |
| B | NO |
| C | NO |
| D | NO |
| E | NO |
| F | NO |
| G | NO |
| H | NO |
| I | NO |
| J | NO |
| K | NO |
| L | NO |
| M | NO |
| N | YES |
| O | YES |
| P | YES |
| Q | YES |
| R | YES |
| S | YES |
| T | YES |
| U | YES |
| V | YES |
| W | YES |
| X | YES |
| Y | YES |
| Z | YES |

| AVAILABLE KEY ELEMENTS | USEABLE IN THIS KEY? |
|---|---|
| N | NO |
| O | NO |
| P | NO |
| Q | NO |
| R | NO |
| S | NO |
| T | NO |
| U | NO |
| V | YES |
| W | YES |
| X | YES |
| Y | YES |
| Z | YES |

| AVAILABLE KEY ELEMENTS | USE IN THIS KEY? | SEQUENCE |
|---|---|---|
| V | NO | N/A |
| W | YES | 2 |
| X | YES | 1 |
| Y | NO | N/A |
| Z | YES | 3 |

FIG. 6

| KEY ELEMENT | KEY ELEMENT SEQUENCE | ELEMENT NAME | FIELD LENGTH | DATA TYPE |
|---|---|---|---|---|
| X | 1 | COMPANY ID | 2 | NUMERIC |
| W | 2 | CREDIT CARD TYPE | 3 | CHARACTER |
| Z | 3 | ON US/NOT ON US | 1 | CHARACTER |

FIG. 7

| ROW | KEY VALUES | | | PCD VALUES |
|---|---|---|---|---|
| | X | W | Z | TRANSACTION CHARGE |
| 1 | 12 | VIS | Y | 10 |
| 2 | 12 | DIS | Y | 8 |
| 3 | 12 | * | * | 12 |
| 4 | 12 | * | Y | 13 |
| 5 | 14 | VIS | N | 12 |
| 6 | 14 | DIS | N | 11 |
| 7 | * | * | * | 14 |

FIG. 8

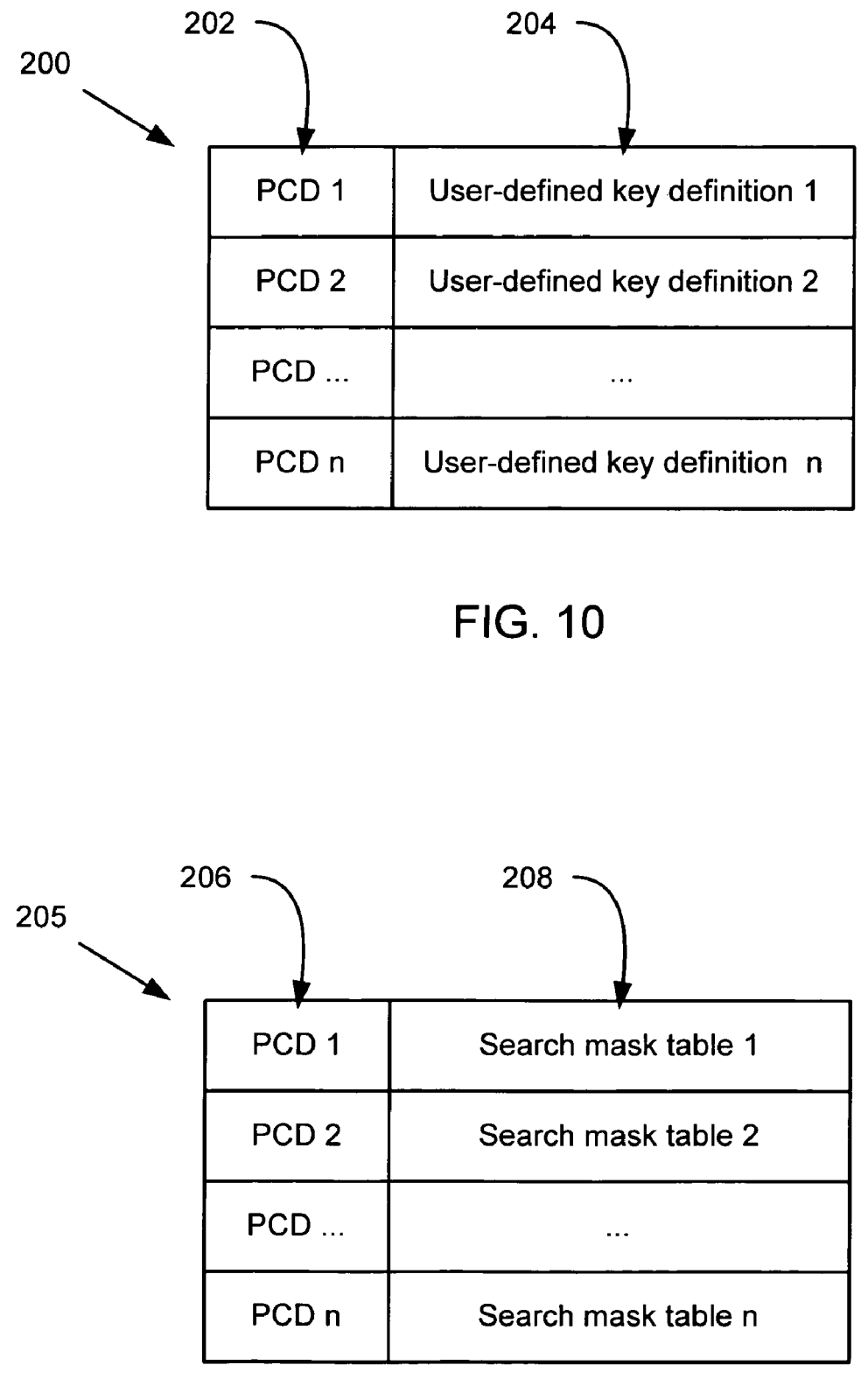

| | |
|---|---|
| PCD 1 | User-defined key definition 1 |
| PCD 2 | User-defined key definition 2 |
| PCD ... | ... |
| PCD n | User-defined key definition n |

FIG. 10

| | |
|---|---|
| PCD 1 | Search mask table 1 |
| PCD 2 | Search mask table 2 |
| PCD ... | ... |
| PCD n | Search mask table n |

FIG. 11

CONFIGURING KEYS FOR USE IN PROCESSING BUSINESS DATA

PRIORITY CLAIM

This application claims the benefit of U.S. Provisional Application No. 60/162,603 entitled "Configuring Keys For Use In Processing Business Data," filed Oct. 29, 1999.

BACKGROUND OF THE INVENTION

1. Field of the Invention

The present invention generally relates to computer software programs and databases to be used in Financial Service Organizations. More particularly, the present invention relates to a system and method for configuring a Financial Service Organization (FSO) production system database.

2. Description of the Related Art

FSOs such as banks, credit unions, etc., use computer systems running software programs to process FSO transactions. The FSO systems may include one or more databases for storing data. The databases may include groups of data such as the master files of customer account information, transaction-related data such as customer credit card purchase transactions, processing-related data such as the processing parameters used in processing transactions including charges to merchants for processing credit card transactions, and history data such as log files of daily activities for batch processing.

The processing parameters used by the FSO system in processing transactions, may be embedded in the source code of the FSO system software programs, or the processing parameters may be stored in one or more tables in the FSO system database. Processing parameters may be used to apply business logic to the transactions during processing. A processing parameter may have different values for different transactions based upon one or more attributes of the transactions. For example, the processing parameter values used in processing a customer credit card transaction made at one department store may be different than the processing parameter values used in processing a customer credit card transaction made at a different department store. Attributes of a transaction may be defined by one or more data elements in the transaction or one or more data elements in a master file associated with the transaction. The attributes could be, for example, the name of a bank issuing the credit card to the customer, or the type of credit card (e.g., gold, platinum, etc.). The FSO system may examine the values of one or more data elements (e.g., gold, platinum, etc.) in the transaction data or master files to determine the value of a processing parameter for the transaction. A set of data elements useable to determine the value of a processing parameter for a transaction may be referred to as a key definition for the processing parameter. Data element values may be extracted from a transaction data set and an associated master file by using the data elements in the key definition to locate the data element values. The data element values may be combined to form a key value for the processing parameter for the transaction. Data elements used in a key definition may be referred to as key elements.

Key definitions and the instructions for constructing or preparing key values are hardcoded in the source code for the FSO system software programs. Modifying the key definitions and the instructions for constructing key values from the key definitions involves modifying the source code for all software programs that use the key definitions and the instructions for constructing the key values, recompiling and relinking the programs, reinstalling the software programs, and possibly modifying a system data dictionary and database structure used by the software programs. If the software programs are used by more than one FSO, and if one of the FSOs requires customized key definitions, customization of the key definitions and instructions for constructing key values for one of the FSOs requires creating and maintaining a customized copy of the source code for the software programs.

In some FSO systems, processing parameters and corresponding key values used to identify and select the processing parameters may be hardcoded in the source code for the FSO system software programs. As an aside, prior FSO systems construct key values and compare the constructed key values to key values embedded in the hardcode in order to find a match. When a match occurs, the corresponding processing parameter is subsequently used in processing the transaction. Modifying the processing parameters and corresponding key values for these systems may involve modifying the source code for all software programs that use the processing parameters, recompiling and relinking the programs, and reinstalling the software programs. In other FSO systems, the processing parameters and corresponding key values may be stored in the FSO system database. In these systems, the processing parameters and corresponding key values in the database must be synchronized with the key definitions and instructions for constructing key values in the source code. Modifying the processing parameters and key values in the database may also require modifying the source code and rebuilding the programs as described above.

As a result of the hardcoding of processing parameters and keys, FSO systems are not flexible in the configuration and use of processing parameters. Any modification to the hardcode must be made by one or more people with sophisticated educational backgrounds and a sufficient understanding of the FSO system. Moreover, the time needed to implement and test modifications to existing FSO systems makes it difficult for FSOs to respond to rapidly changing business strategies.

The following is, hereby, incorporated by reference: Data retrieval method and apparatus with multiple source capability (U.S. Pat. No. 6,023,694), Graphical user interface for relating key index properties to database table columns (U.S. Pat. No. 5,553,218), Index managing method in database managing system (U.S. Pat. No. 5,806,058) and Relational database management system for chemical structure storage, searching and retrieval (U.S. Pat. No. 5,950,192).

SUMMARY OF THE INVENTION

A system, method and carrier medium for configuring keys to locate processing parameters stored in a Financial Service Organization (FSO) computer system database. In one embodiment, data may be stored in tables in the database. In one embodiment, a key definition table, one or more process control data (PCD) tables for storing processing parameter values and key values, and/or one or more search mask tables for storing key definition-based search masks for the key values in the PCD tables may be provided. In one embodiment, user interfaces to enter, modify, and delete data in the key definition, PCD, and search mask tables may be provided.

In one embodiment, a program executing on an FSO computer system may provide a user interface that may allow a user of the program to construct key definitions for building the processing key values used in locating processing parameters in the FSO system database. The key definitions may be constructed by selecting one or more data elements to be included as key elements in the key definition. The data elements may be displayed for selection in the graphical user interface. The user interface may also provide a method for specifying a sequence or map that identifies the arrangement of the key elements in the key definition. The key definitions may be stored in the database in the FSO system. In one embodiment, the key definitions may be stored in a key definition table in the database.

In one embodiment, a program executing on an FSO computer system may provide a user interface that may allow a user of the program to enter processing parameter values and key values. The processing parameter values may be configured for use during the processing of data, including FSO transactions, in the FSO computer system. The key values may be configured for use in locating the processing parameters in the FSO computer system. In one embodiment, processing parameter values and key values may be stored in a process control data (PCD) table in the database, with one row in the table including one or more fields for storing a key value and one or more fields for storing processing parameter values associated with the key value. In one embodiment, there may be one PCD table in the database for each processing parameter in the FSO system, with each row in the table including one unique key value for the key definition for the processing parameter, and each row also including the processing parameter values locatable using the unique key value. In one embodiment, a key definition may be used to format the user interface for entering key element values. A key element value may be entered for each key element in the key definition, and the key element values may be combined to construct a key value. In one embodiment, wildcard values may be entered as key element values for key elements.

In one embodiment, a program executing on an FSO computer system may provide a user interface that may allow a user of the program to enter one or more search masks configured for use in searching for a processing key value in the key values for a processing parameter. In one embodiment, a search mask may include one or more search mask fields. In one embodiment, a key definition may be used to format the user interface for entering the search masks, with one search mask field displayed for each key element in the key definition. A search mask value may be entered in a search mask field for each key element in the key definition. In one embodiment, the search masks for a processing parameter may be stored in a search mask table in the database, with one row in the table storing one search mask. In one embodiment, the search masks for a processing parameter may be stored in the search mask table in the database in a sequence in which the search masks may be used in searching for a processing key value in the key values for the processing parameters. In one embodiment, wildcard mask values and equal mask values may be entered as mask values in search mask fields.

In one embodiment, the key definitions, key values, processing parameter values, and search masks may be constructed and stored during the configuration of the FSO system. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system. During reconfiguration, the key definitions, key values, processing parameter values, and search masks constructed during the initial configuration may be modified or deleted, and new key definitions, key values, processing parameter values, and search masks may be added to the FSO system. Some data may be processed differently in the FSO system after a reconfiguration of the FSO system than before the reconfiguration. For example, a key value may be assigned a different processing parameter value in a PCD table after a reconfiguration, and thus a different processing parameter value may be returned to a program for a processing key value after the reconfiguration than would have been returned before the reconfiguration.

BRIEF DESCRIPTION OF THE DRAWINGS

FIG. 4 illustrates one embodiment of a method for selecting data dictionary data elements as key elements available for inclusion in key definitions;

FIG. 5 illustrates one embodiment of a method for selecting key elements to be available for inclusion in a particular key definition from a list of key elements available for inclusion in all key definitions;

FIG. 6 illustrates one embodiment of a method for selecting key elements for inclusion in a key definition from a list of key elements available for inclusion in the key definition;

FIG. 7 illustrates one embodiment of a key definition with examples of parameters that may be included in the key element definitions;

FIG. 8 illustrates one embodiment of a PCD table for the key definition of FIG. 7 with examples of key values and processing parameter values;

FIG. 10 illustrates one embodiment of a structure for a database table for storing key definitions;

FIG. 11 illustrates one embodiment of a structure for a database table for referencing search masks;

Figure 1:
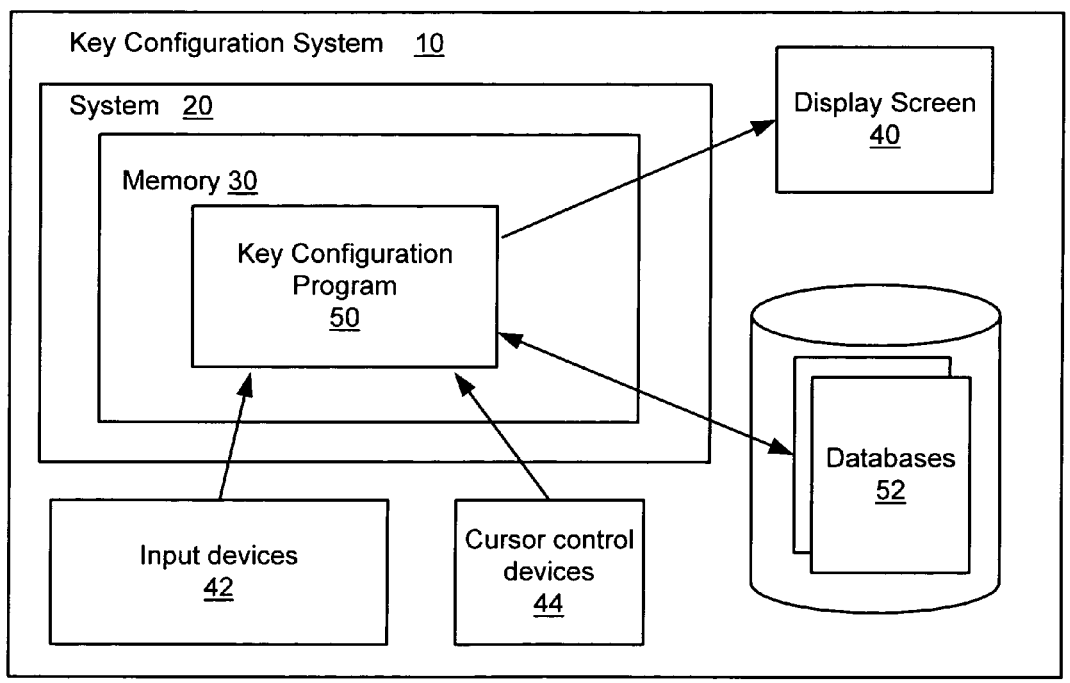
FIG. 1 is a block diagram illustrating one embodiment of a computer system for configuring key definitions.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

The term "computer system" as used herein generally describes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may comprise other types of memory or combinations thereof. In addition, the memory medium may be located in a first computer in which the programs are executed, or may be located in a second computer that connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for configuring the FSO system software programs and databases in an FSO system, and for processing FSO transactions in the FSO system, as described herein. The software program(s) may be implemented in any of various ways, including procedure-based techniques, component-based techniques, and/or object-oriented techniques, among others. For example, the software program(s) may be implemented using ActiveX controls, C++ objects, JavaBeans, Microsoft Foundation Classes (MFC), or other technologies or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system, a specialized software program that manages and provides services to other software programs on the computer system. Examples of operating systems may include, but are not limited to: Windows NT available from Microsoft Corporation, and; the MvS and OS/390 operating systems available from IBM. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory, as the program requires the data.

As used herein, a Financial Service Organization (FSO) is a business organization that provides financial services to customers and client organizations. As used herein, the term customer generally refers to an individual, and client organization generally refers to other businesses, including retail businesses and other FSOs. Services provided to customers and client organizations include credit products, such as loans and credit cards. An FSO may also provide services to client organizations such as credit card transaction processing. Examples of FSOs include, but are not limited to, banks and credit unions. An FSO that issues credit cards and processes credit card transactions may be referred to as a credit card institution. An FSO may include one or more organizational units. Examples of organizational units include, but are not limited to, main offices, divisions, regional offices, and branch offices.

As used herein, an FSO transaction may be defined as an occurrence of a service provided to a customer or client organization. Examples of FSO transactions include, but are not limited to, financial transactions such as deposits, withdrawals, loan application servicing, and credit card application servicing. FSO transactions may also include services related to financial products such as loans and credit cards previously issued to FSO customers and client organizations. These services may include processing of credit card purchases and collection of payments.

An FSO system may include a data dictionary. A data dictionary may be defined as a collection of descriptions of data items in the database. A description of a data item in a database may be called a data element. A data item may be referred to as a data element value. A data element in the data dictionary may describe attributes of a data element value in the database. Examples of attributes of data element values include, but are not limited to: location in the database, size, and data type. For example, an FSO system data dictionary may describe the data elements involved in credit card processing. The data dictionary may describe each of the data elements in the database for credit card processing. Groups of data such as master files and transaction data sets may comprise data elements defined in the data dictionary. Examples of data elements in an FSO data dictionary include, but are not limited to: customer name, credit card type, and card issuer.

In the context of this application, a key is one or more data elements in a database record or group of records that may be used to identify the record or group of records. For example, a record for storing information about an individual may have a name data element. The name data element may be used as a key to identify a particular individual's record in the database. A key value is an instance of a key in the database. In the example above, an example of a key value for a name data element used as a key might be "John Smith." In some examples, not all data elements in a database may be available for use in keys. Data elements that are available for use in keys may be referred to as key elements.

The format of a key may be stored in a key definition. A key definition may include one or more key elements that in combination make the key. During configuration of an FSO system, key definitions may be used in creating key values for records or groups of records in the database. During processing, key definitions may be used by the FSO system to create key values and to read key values stored in the database. During the processing of a transaction, the FSO system may create a key value from a transaction-related data using a key definition to extract data element values from the transaction-related data, and may compare the key value to key values stored in the database while searching for a matching key value. A key value created during processing from a key definition and a transaction-related data may be referred to as a processing key value.

The FSO system database may include processing parameters used in processing transactions. Processing parameters may be used to apply business logic to the transactions during processing. An example of a transaction processed in an FSO system is a credit card purchase transaction. An example of a processing parameter is a credit card purchase transaction price that may be charged to a client of a credit card institution for the processing of a credit card purchase transaction. An instance of a processing parameter in the database may be referred to as a processing parameter value. For example, an instance of a credit card purchase transaction price might be "$1.50." In some cases, a processing parameter value may include more than one data value. For example, a matrix of data values used in transformation functions on tables of data may be stored as a processing parameter value.

An FSO transaction processing software program may use one or more processing parameters during the processing of a transaction. A processing parameter may have a different processing parameter value for different transactions. The software program may examine the values of one or more data elements in the transaction data and master files to determine the processing parameter value for the transaction. A combination of data elements used to determine the processing parameter value may be referred to as a key definition for the processing parameter. The combination of data element values constructed from the key definition may be referred to as a key value. The key value is used to identify the appropriate processing parameter for processing the transaction. For example, a software program for processing credit card transactions for a credit card institution may use the credit card issuer and card type to determine what transaction price to charge a client of the credit card institution for processing a credit card transaction. The key definition in this example includes the credit card issuer data element and card type data element, and the key value is constructed from the values for the credit card issuer data element and card type data element read from the credit card transaction data or from a master file associated with the transaction. The constructed key value identifies the proper transaction price to charge the client.

In one embodiment, processing parameters and the key values used to identify them may be stored in tables in the database. The tables in the database that store the processing parameters and keys may be referred to as Process Control Data (PCD) tables. In one embodiment, there may be one PCD table for each processing parameter in the FSO system.

Processing parameters are one example of parameters that may be stored in PCD tables and located using key definitions as described herein. Examples of other types of parameters that may be stored in PCD tables are default parameters and definition parameters. Default parameters may be used to fill in default information in records in the database when they are created. For example, when a new customer account is created, one or more fields in the customer account master file may be filled with default parameter values. Default parameter values may be retrieved from PCD tables using key values constructed from the PCD key definitions and data element values from the customer account master file. Definition parameters are text or numeric values that are located using key values as codes. An example is a text error message that may be looked up using a numeric error code as a key value.

During processing, an FSO transaction may be stored as a record or file in the FSO system. In one embodiment, the FSO transaction may be stored in the FSO system database. A portion of the FSO transaction record may be read into system memory during processing. An FSO transaction record may include one or more data elements. The data elements included in an FSO transaction record may be defined in the data dictionary. The data elements in the transaction record may describe the various attributes of the transaction. For example, the data elements in a credit card transaction record may include items such as the customer's name, account numbers, credit card type, card issuer, date of the transaction, and the business at which the transaction originated.

An example of an FSO that may use an FSO computer system as described herein is a credit card institution. A credit card institution may issue credit cards to customers and client institutions of the FSO. The credit card institution may also issue credit cards on behalf of client businesses such as department stores. The credit card institution may also acquire and process credit card transactions from customers and client businesses such as department stores. For example, a credit card institution may issue its own credit card. Continuing the example, the credit card institution may also have client department stores. The credit card institution may issue a credit card under a department store's name, and may collect and process all credit card transactions for the department store. The credit card institution may charge a fee for each transaction processed. Some of the credit card transactions collected by the credit card institution may be transactions for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

In the above example, the fee charged for each transaction, also called the merchant transaction price, is an example of a processing parameter for an FSO system in a credit card institution. One embodiment of an FSO system database in a credit card institution may include a merchant transaction pricing PCD table. The merchant transaction pricing PCD table may include one or more merchant transaction pricing values. Each merchant transaction pricing value may be associated with one unique key value in the table. The key values in the PCD table may be constructed using a key definition. Each processing parameter in the FSO system, and thus each processing parameter PCD table, may be associated with a key definition. In one embodiment, the FSO system database may include a key definition table for storing key definitions in the FSO system.

A key definition may include one or more data elements from the data dictionary. As an example, the merchant transaction pricing parameter described above may have a key definition that includes one or more data elements. Examples of data elements that may be included as fields in the merchant transaction pricing parameter key definition include card issuer, card type, on us/not on us, and transaction type. A card issuer may be the brand of card, for example, VISA, MasterCard, Discovery, etc. Examples of card types may include, but are not limited to: "gold" and "platinum" cards issued by some card issuers. On us/not on us refers to whether the FSO processing the transaction also issued the credit card. "On us" may mean that the FSO did issue the card. "Not on us" may mean that another FSO issued the card, and thus the transaction may be forwarded to the other FSO for processing. The term "transaction type" may refer to the way the transaction was entered; examples of transaction types may include, but are not limited to: manual, electronic, and telephone transactions. A manual credit card transaction may be a credit card transaction that is entered by hand and imprinted with a credit card imprint machine. An electronic transaction may be a credit card transaction where the magnetic strip on a credit card is read electronically. A telephone transaction may be a credit card transaction performed by telephone call.

FIG. 1—A Block Diagram Illustrating One Embodiment of a Computer System for Configuring Key Definitions In FIG. 1, an embodiment of a key configuration system 10 may include a computer system 20, a display screen 40 connected to the computer system, and one or more databases 52 residing on external storage. Computer system 20 includes memory 30 configured to store computer programs for execution on computer system 20, and a central processing unit (not shown) configured to execute instructions of computer programs residing on computer system 20. Key configuration program 50 may be stored in memory 20. System 10 may also include one or more input devices 42 such as a keyboard for entering data and commands into program 50 and one or more cursor control devices 44 such as a mouse.

Figure 2:
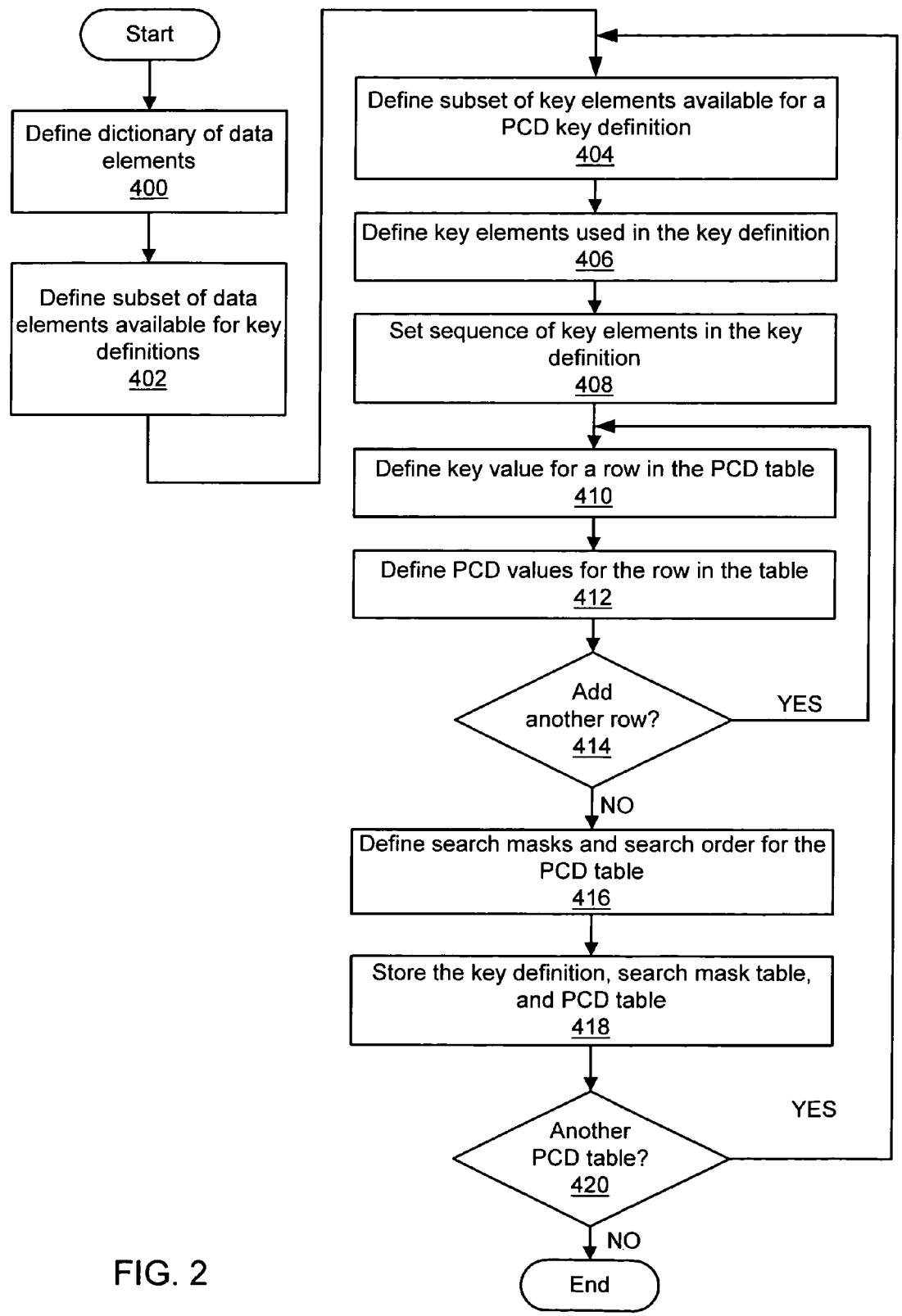
FIG. 2 is a flowchart illustrating one embodiment of a method for user configuration of key definitions, PCD tables, and search mask tables in an FSO system.

FIG. 2—A Flowchart Illustrating One Embodiment of a Method for User Configuration or Reconfiguration of Key Definitions, PCD Tables, and Search Mask Tables in an FSO System FIG. 2 illustrates an embodiment of a method that may be followed by a user of an FSO system for configuration of the key definitions, Process Control Data (PCD) tables, and search mask tables for use in the dynamic location of processing parameters during processing of customer account data sets in the FSO system. PCD tables may also be referred to as processing parameter tables. In step 400, the user may define the dictionary of data elements to be used in the FSO system database. In step 402, the user may select from the dictionary of data elements a subset of data elements that are available for use in key definitions. In one embodiment, some data elements may be pre-defined in the data dictionary, and a portion of the data elements in the data dictionary may be pre-selected to be available for use in key definitions.

Steps 404 through 420 are an iterative process that may be repeated for each PCD table to be configured by the user. These steps may also be followed to reconfigure a PCD table to reflect changing transaction-processing requirements. In step 404, the user may select a first processing parameter to configure, and may select from the data dictionary a subset of data elements to be key elements from which the key elements in the key definition will be selected. In step 406, the user may select the key elements to be used in the key definition from the key elements selected in step 404. In step 408, the user may specify the sequence the selected key elements will appear in the key definition.

Steps 410 through 414 are an iterative process that may be repeated for each row to be added to the PCD table by the user. In step 410, the user may first add a new row to the PCD table, and may define the key value for the row. In step 412, the user may define the processing parameters value(s) for the row. In step 414, if there are more rows to be added to the PCD table, the user returns to step 410. If there are no more rows to be added, the user may proceed to step 416.

In step 416, the user may define one or more search masks for the key values in the PCD table. In one embodiment, the search masks may be arranged by the user in a sequence in which the masks will be used in building or constructing processing key values for searching the PCD table for a best matching key value. In step 418, the user may have completed the configuration of this PCD table, key definition, and search mask table, and the tables and key definition may be stored in the database. In step 420, if there are more PCD tables to be configured, the user may return to step 404 to configure the next PCD table. If the user has configured all of the PCD tables to be configured, the process ends.

FIGS. 3 through 13 illustrate the steps in the process illustrated in FIG. 2 in more detail, and include examples of embodiments of structures and tables that may be configured using the process.

Figure 3:
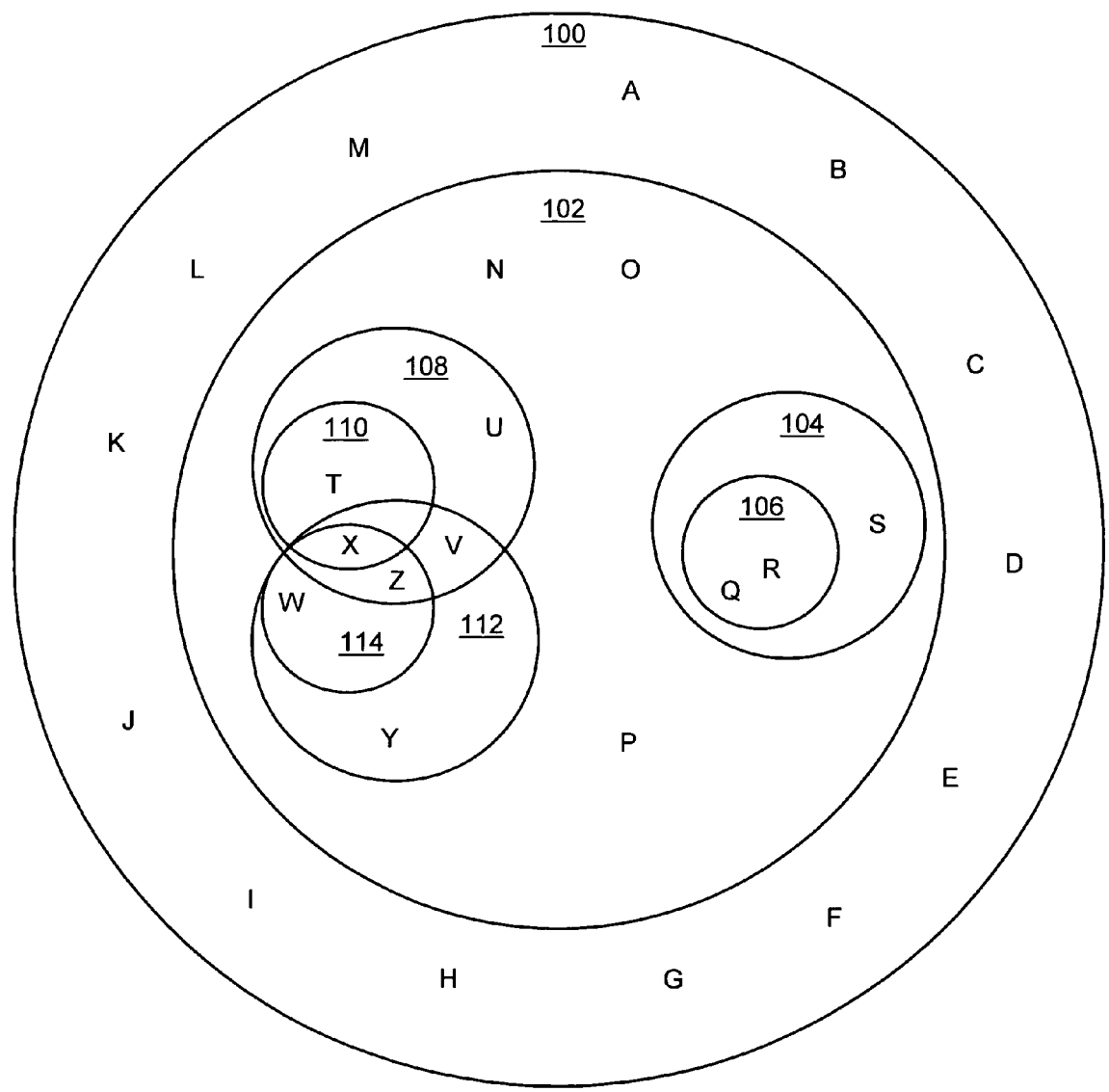
FIG. 3 illustrates one embodiment of a data dictionary with the data elements in the data dictionary divided into subsets available for inclusion in key definitions.

FIG. 3—One Embodiment of a Data Dictionary with the Data Elements in the Data Dictionary Divided into Subsets Available for Inclusion in Key Definitions FIG. 3 illustrates one embodiment of a data dictionary for a database configured for use in an FSO system, with the data elements in the data dictionary divided into subsets available for inclusion in key definitions. In this illustration, by way of example, the letters A through Z are used to represent all the data elements in the universe of data elements in data dictionary 100. From the universe of data elements in the data dictionary, a data element set 102 of data elements available for use in all key definitions may be selected by a user of the FSO system. In this example, data elements N through Z have been selected for inclusion in data element set 102. The user may divide data element set 102 into data element subsets available for particular key definitions. Data element subsets may overlap. In this example, data element subset 104 includes Q, R, and S, data element subset 108 includes T, U, V, X, and Z, and data element subset 112 includes V, W, X, Y and Z. Data element subsets 108 and 112 both include V, X, and Z. For each key definition, the user may select the data elements to be used in the key definition. In this example, key definition 106 includes Q and R from data element subset 104, key definition 110 includes T and X from data element subset 108, and key definition 114 includes W, X and Z from data element subset 112. More than one key definition may include a data element. In this example, key definitions 110 and 114 both include data element X.

FIG. 4—One Embodiment of a Method for Selecting Data Dictionary Data Elements as Key Elements Available for Inclusion in Key Definitions FIG. 4 illustrates one embodiment of a method for a user of an FSO system to select data dictionary data elements as key elements available for inclusion in key definitions in an FSO system. In this illustration, by way of example, the letters A through Z are used to represent the data elements in the universe of data elements in the data dictionary. In one embodiment, the database may include a table including references to all data elements in the data dictionary that are "useable in keys." In another embodiment, each data element in the data dictionary may have a useable in keys parameter associated with it. In one embodiment, the useable in keys parameter may be a binary parameter, and may be set to either allow the data element to be used in key definitions or to exclude the data element from use in key definitions. In one embodiment, a particular data element in the data dictionary may be selected, and information about the selected data element including the useable in keys parameter may be presented on a computer display screen. In one embodiment, a list 122 of all data elements in the data dictionary may be presented on a computer display screen 120 to a user of the FSO system. In one embodiment, a current state 124 of the useable in keys parameter may be displayed with each data element. The state of the useable in keys parameter may be displayed in any form suitable to represent a binary parameter. Examples of forms of displaying states of binary parameters include, but are not limited to: textual binary displays such as YES/NO, Y/N, TRUE/FALSE, T/F, I/O and ON/OFF, and; graphic binary displays, such as check boxes and radio buttons. In this example, YES/NO is used, with YES representing a useable in keys parameter set to allow the data element to be used in key definitions, and NO representing a useable in keys parameter set to exclude the data element from use in key definitions. A user may change the state of a useable in keys parameter for a data element by changing the displayed state of the useable in keys parameter. In one embodiment, the user may select the useable in keys parameter using a cursor control device and enter the textual representation of the desired state of the useable in keys parameter using an input device.

FIG. 5—One Embodiment of a Method for Selecting Key Elements to be Available for Inclusion in a Particular Key Definition from a List of Key Elements Available for Inclusion in all Key Definitions FIG. 5 illustrates one embodiment of a method for a user of an FSO system to select a group of key elements available for inclusion as key elements in a particular key definition in the FSO system. In this illustration, by way of example, the letters A through Z are used to represent the data elements in the universe of data elements in the data dictionary. In one embodiment, a list 132 of all key elements available for inclusion in key definitions may be presented on a computer display screen 130 to a user of the FSO system. In this example, list 132 includes key elements N through Z. Each key element in list 132 may have a useable in key parameter 134 associated with it. In one embodiment, a current state 134 of the useable in key parameter may be displayed with each key element. The state of the useable in key parameter may be displayed in any form suitable to represent a binary parameter. In this example, YES/NO is used, with YES representing a useable in key parameter set to allow the key element to be used in this key definition, and NO representing a useable in key parameter set to exclude the data element from use in this key definition. A user may change the state of a useable in key parameter for a key element by changing the displayed state of the useable in key parameter. In one embodiment, the user may select the useable in key parameter using a cursor control device and enter the textual representation of the desired state of the useable in key parameter using an input device.

FIG. 6—One Embodiment of a Method for Selecting Key Elements for Inclusion in a Key Definition from a List of Key Elements Available for Inclusion in the Key Definition FIG. 6 illustrates one embodiment of a method for a user of an FSO system to select key elements for inclusion in a key definition from a list of available key elements for the key definition in the FSO system. In this illustration, by way of example, the letters A through Z are used to represent the data elements in the universe of data elements in the data dictionary. In one embodiment, a list 142 of all key elements available for inclusion in a particular key definition may be presented on a computer display screen 140 to a user of the FSO system. In this example, list 142 includes key elements V through Z. Computer display screen 140 may also display a "use in this key" parameter 144 and a key element sequence parameter 146 for each key element displayed. The state of the "use in this key" parameter 144 may be displayed in any form suitable to represent a binary parameter. In this example, YES/NO is used, with YES representing a key element selected to be used as a key element in this key definition, and NO representing a key element not selected to be used as a key element in this key definition. A user may change the state of the "use in this key" parameter for a key element by changing the displayed state of the "use in this key" parameter. In one embodiment, the user may select the "use in this key" parameter using a cursor control device and enter the textual representation of the desired state of the "use in this key" parameter using an input device. In this example, the "use in this key" parameter for key elements W, X and Z are set to YES to indicate that W, X and Z are to be used as key elements in the key definition. The key element sequence parameter may be used to specify the order in which the key elements will appear in the key definition. In this example, key element X is set to appear as the first key element, key element W is set to appear as the second key element, and key element Z is set to appear as the third key element.

FIG. 7—One Embodiment of a Key Definition with Examples of Parameters that May be Included in the Key Element Definitions FIG. 7 illustrates an embodiment of a key definition that may have been defined by a user of an FSO system, with key elements displayed on a key definition screen 150. Each key element may include several parameters that define the key element. In one embodiment, the key elements may be displayed as rows on computer display screen 150, with the columns displaying key element parameters. This example shows key elements X, W, and Z. Key element column 152 displays the key element name. Key element sequence column 154 displays the order in which the key elements may appear in the key definition. In this example, key element X is the first key element, key element W is the second key element, and key element Z is the third key element. Element name column 156 may display a data element name. In this example, key element X is Company ID, key element W is the Credit Card Type, and key element Z is ON US/NOT ON US. Field length column 158 may display a length in units for the key element. In one embodiment, the units are 8-bit bytes. In this example, key element X is 2 bytes long, key element W is 3 bytes long, and key element Z is one byte long. Data type column 160 may display a data type for the key element. In this example, key element X is of data type numeric, and key elements W and Z are of data type character.

FIG. 8—One Embodiment of a PCD Table for the Key Definition of FIG. 7 with Examples of Key Values and Processing Parameters FIG. 8 illustrates an embodiment of a PCD table 170 from a database used in an FSO system, with rows including key values 174 and processing parameters 178 associated with the key values. A PCD table may be used to store key values and the processing, or PCD, values associated with the key values. The key values and processing parameters may be entered by a user of the FSO system. In one embodiment, a PCD table may include pre-defined key values and processing parameters, and the user of the FSO system may add key values and processing parameters to the PCD table.

A PCD table may be searched for a particular key value to find the processing parameter associated with the key value. In this example, PCD table 170 may be used to access credit card merchant transaction charges 179 for different key values. In the credit card business, an Acquirer is an FSO that manages credit card accounts, processes credit card transactions, and collects credit card payments as an agent of one or more organizations, or companies. The FSO may charge a merchant transaction charge for each credit card transaction processed. The ability for a user of the FSO system to configure key definitions and PCD tables at configuration time allows the FSO to define merchant transaction charges for a particular transaction based upon attributes of the transaction. For example, a bank may manage the Visa and Discovery credit card transactions for Store 12 and Store 14. The user may include one or more attributes (data elements) of the transaction as key elements in the key definition, and may define one or more permutations of key values and associated merchant transaction prices for the permutations in the merchant transaction pricing PCD table. In this example, the bank may define different transaction prices for processing Discovery transactions for Store 12 than it charges for processing Discovery transactions for Store 14.

In one embodiment, each row 172 in table 170 holds one key value and its associated processing parameter. In one embodiment, each key value is unique among the key values in the PCD table. Each key definition is associated with one PCD table. A key value may be constructed from the key element values stored in the one or more key elements defined in the key definition for this PCD table. In this example, the key values are constructed from key elements X (175), W (176), and Z (177), as defined in key description 150 illustrated in FIG. 7. In FIG. 8, row 1's key value is (12, VIS, Y). The processing parameter corresponding to the key value of (12, VIS, Y) is 10. Searching PCD table 170 for the key value of (12, VIS, Y) will return the transaction charge of 10.

In one embodiment of PCD tables, wildcard values may also be entered as key element values in a PCD table. In FIG. 8, key element with wildcard values are represented by asterisks ("*"). In one embodiment of PCD tables, low collating values for the data type of the key element may be used as wildcard key element values. For example, key elements of numeric data type may use zero (0) as a low collating value, and character fields may use spaces, or blank characters, as low collating values. Other key element types may have low collating values specific to the type. Any or all of the key element values in a row of a PCD table may be set to a wildcard value. In FIG. 8, row 3 has key elements W and Z set to wildcard values, row 4 has key element W set to a wildcard value, and row 7 has all of its key elements (X, W, and Z) set to wildcard values. In one embodiment, to specify a wildcard value for a key element value, the user may enter a wildcard display value (for example, "*") in the PCD table entry display screen, and the FSO system may then substitute the low collating value for the data type of the key element set to the wildcard display value when storing the key value in the PCD table.

Figure 9:
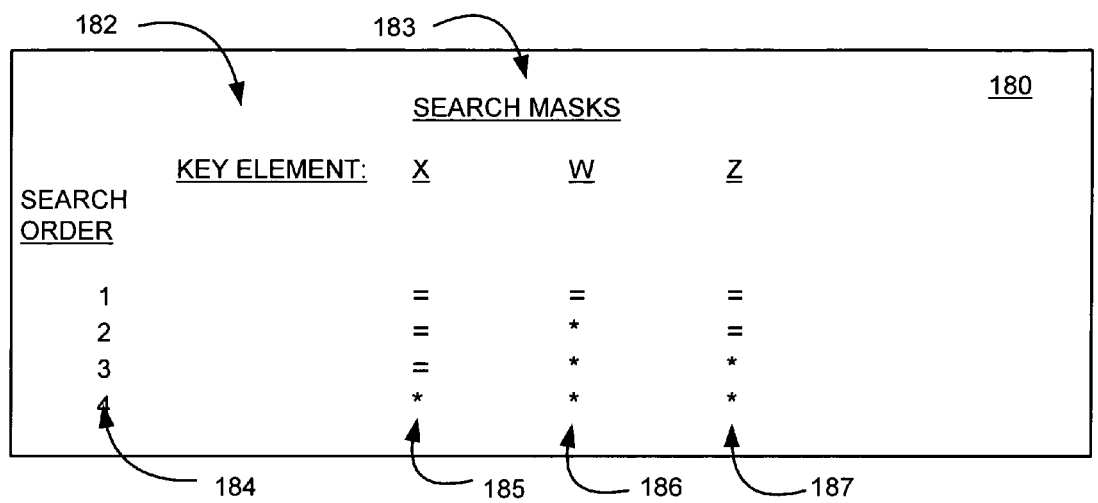
FIG. 9 illustrates one embodiment of a search mask table with examples of search masks that may be applied to the PCD table of FIG. 8.

FIG. 9—One Embodiment of a Search Mask Table with Examples of Search Masks that May be Applied to the PCD Table of FIG. 8

In one embodiment of an FSO system using PCD tables to store key values and associated processing parameters, each PCD table and corresponding key definition may have an associated search mask table. A user of the FSO system may enter the search masks in the search mask table. A search mask table may include one or more rows for storing search masks entered by the user, with each row including one column, or mask field, for each of the key elements in the key definition. In the example illustrated in FIG. 9, search mask table 180 may be defined for key definition 150 illustrated in FIG. 7 and PCD table 170 illustrated in FIG. 8. Thus, search mask table 180 may include mask fields corresponding to key elements X, W, and Z in key definition 150. The user of the FSO system may enter a mask field value for each mask field in each search mask in a search mask table.

In one embodiment of a search mask table, mask field values may include an equal mask field values and a wildcard mask field value. In one embodiment, an equal mask field value may be entered by the user and displayed on the search mask entry display screen as an equal sign ("="), as illustrated in FIG. 9. In one embodiment, a wildcard mask field value may be entered by the user and displayed on the search mask entry display screen as an asterisk ("*"), as illustrated in FIG. 9. In one embodiment, an equal mask field value in a mask field may specify that, when constructing a processing key value from the data element values in a customer account data set during processing of the customer account data set, the key element value in the processing key value corresponding to the mask field will be set to the data element value from the customer account data set. In one embodiment, a wildcard mask field value in a mask field may specify that, when constructing a processing key value from the data element values in a customer account data set during processing of the customer account data set, the key element value in the processing key value corresponding to the mask field will be set to the low collating value for the data type of the key element.

One embodiment of a PCD table search process in an FSO system may use the search masks in a search mask table to construct processing key values from a customer account data set. In one embodiment, the search process may start at the first search mask in the search mask table, build a processing key value from the customer account data set using the first search mask, and search the PCD table for a key value that matches the processing key value. If a matching key value is found, the search process may return the processing parameter for the key value to a program that requested the processing parameter for the customer account data set. If a matching key value is not found, the search process go to the second search mask in the search mask table, build a processing key value from the customer account data set using the second search mask, and search the PCD table for a key value that matches the processing key value. The search process may iterate through the search masks in the search mask table until a matching key value is found or until there are no more search masks. When no matching key value is found and all search masks have been used, a message may be returned to the requesting program that no processing parameter exists for the customer account data set.

Search mask table 180 illustrated in FIG. 9 includes four search masks 183 that may be used with key definition 150 illustrated in FIG. 7 to construct a processing key value from a customer account data set during a search of PCD table 170 illustrated in FIG. 8. In FIG. 9, the search masks are in a search order 184 from search mask 1 to search mask 4. In search mask 1, mask fields X, W, and Z are all assigned equal mask field values, represented by an equal sign ("="). Search mask 2 has mask fields X and Z assigned equal mask field values, and mask field W assigned a wildcard mask field value represented by an asterisk ("*"). Search mask 3 has mask field X assigned an equal mask field value and mask fields W and Z assigned wildcard mask field values. Finally, in search mask 4, mask fields X, W and Z are all assigned wildcard mask field values.

Search mask table 180 illustrated in FIG. 9 includes a search mask where all of the mask fields are set to the equal mask field value, and also includes a search mask where all of the mask fields are set to the wildcard mask field value. In one embodiment, search mask tables may not be required to include search masks where all mask fields are set to equal mask field values. In one embodiment, search mask tables may not be required to include search masks where all mask fields are set to wildcard mask field values.

FIG. 10—One Embodiment of a Structure for a Database Table for Storing Key Definitions FIG. 10 illustrates one embodiment of a database table that may be used to store key definitions defined by a user in an FSO system. Key definition table 200 may include PCD table identifiers 202 and user-defined key definitions 204. In one embodiment of an FSO system using user-defined key definitions, there is one key definition table 200 in an FSO system database. In one embodiment of an FSO system using user-defined key definitions, there is one row in key definition table 200 for each PCD table in the FSO system database, with each row including one PCD table identifier 202 that references the PCD table and one key definition 204 that defines the key format for the PCD table.

In an FSO system, key definition table 200 may be used during configuration of the FSO system to store key definitions 204 defined by a user of the system. Key definition table 200 may also be used during configuration to present a display screen to the user of the FSO system for defining key values and their associated processing parameters in a PCD table. Key definition table 200 may also be used during configuration to format the key values defined by the user as the key values are stored in the key value fields of the PCD table. Key definition table 200 may also be used during configuration to present a display screen to the user for defining search masks for key definitions, and to format the search masks defined by the user as they are stored in a search mask table.

In an FSO system, the user-defined key definitions 204 in key definition table 200 may be used during the processing of FSO business data, including the processing of customer account data sets. A computer program running on the FSO system may request a processing parameter from a PCD table during the processing of a customer account data set. In response to the request, the user-defined key definition 204 for the PCD table may be read from key definition table 200 and used with a user-defined search mask for the key definition to construct a processing key value from the customer account data set. The processing key value may be used to search the PCD table for the PCD key value that matches the processing key constructed from the customer account data set. If a matching PCD key value is found, the processing parameter for the matching PCD key value is returned to the calling program.

FIG. 11—One Embodiment of a Database Structure for Referencing Search Masks

FIG. 11 illustrates one embodiment of a database structure that may be used to store and reference search masks defined by a user in an FSO system. A table 205 may include PCD table identifiers 206 and references to search mask tables 208. In one embodiment of an FSO system using user-defined key definitions and search masks, there is one table 205 in an FSO system database. In one embodiment of an FSO system using user-defined key definitions and search masks, there is one row in table 205 for each PCD table in the FSO system database, with each row including one PCD table identifier 206 that references the PCD table and one reference to a search mask table 204. In another embodiment of table 205, all of the search mask tables may be merged into table 205, with one row in table 205 for each search mask for each PCD table.

In an FSO system, the search mask tables 208 in table 205 may be used during the processing of FSO business data, including the processing of customer account data sets. A computer program running on the FSO system may request a processing parameter from a PCD table during the processing of a customer account data set. In response to the request, the user-defined key definition for the PCD table may be read from a key definition table. A first user-defined search mask may be read from search mask table 208 for the PCD table and may be used with the key definition to construct a first processing key value from the customer account data set. The first processing key value may be used to search the PCD table for a PCD key value that matches the first processing key value constructed from the customer account data set. If a matching PCD key value is found, the processing parameter for the matching PCD key value is returned to the calling program. If a matching PCD key value is not found, a second user-defined search mask may be read from search mask table 208 and used with the key definition to construct a second processing key value. The second processing key value may be used to search the PCD table for a PCD key value that matches the second processing key value. The process of reading a next search mask, building a processing key, and searching the PCD table may continue until a matching PCD key value is found or until all search masks have been used and no matching PCD key value is found.

Figure 12:
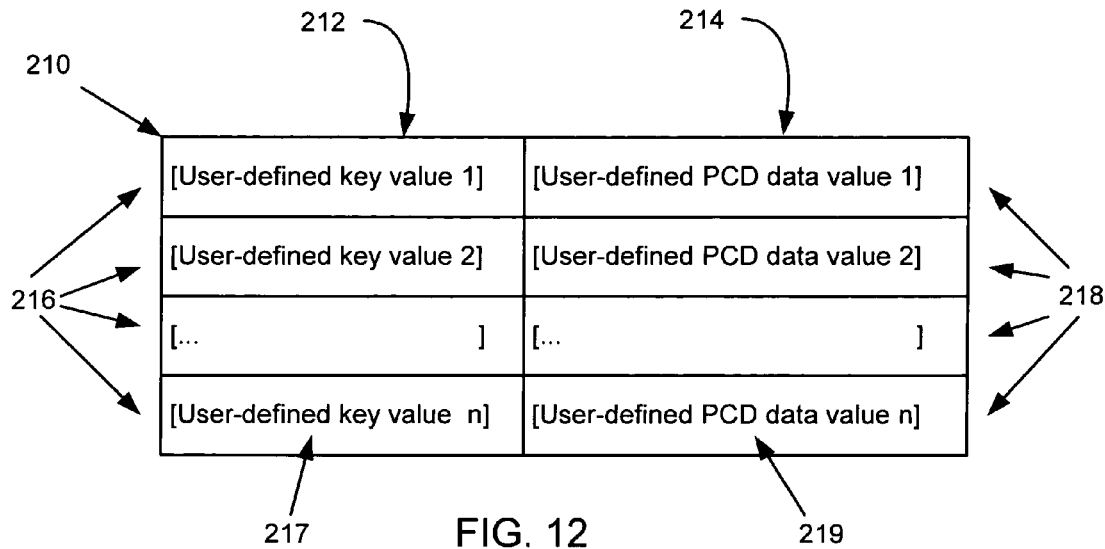
FIG. 12 illustrates one embodiment of a structure for a user-defined PCD table with key values and data values.

FIG. 12—One Embodiment of a Structure for a User-Defined PCD Table with Key Values and Data Values FIG. 12 illustrates one embodiment of a PCD table for storing key values and associated PCD data values defined by a user of the FSO system using a process as illustrated in FIG. 8. Referring to FIG. 12, PCD table 210 may include cells 216 for storing user-defined key values 217 in one column 212 and cells 218 for storing user-defined PCD data values 218 in a second column 216. One row in the table may include one cell 216 for storing a user-defined key value 217 and one cell 218 for storing the user-defined PCD data value 219 associated with the key value. In this example, user-defined key values (1, 2, . . . , n) correlate to user-defined processing parameters (1, 2, . . . , n). A user-defined key value 217 may include one or more key element values. A user-defined PCD data value 219 may include one or more processing parameter values.

Figure 13:
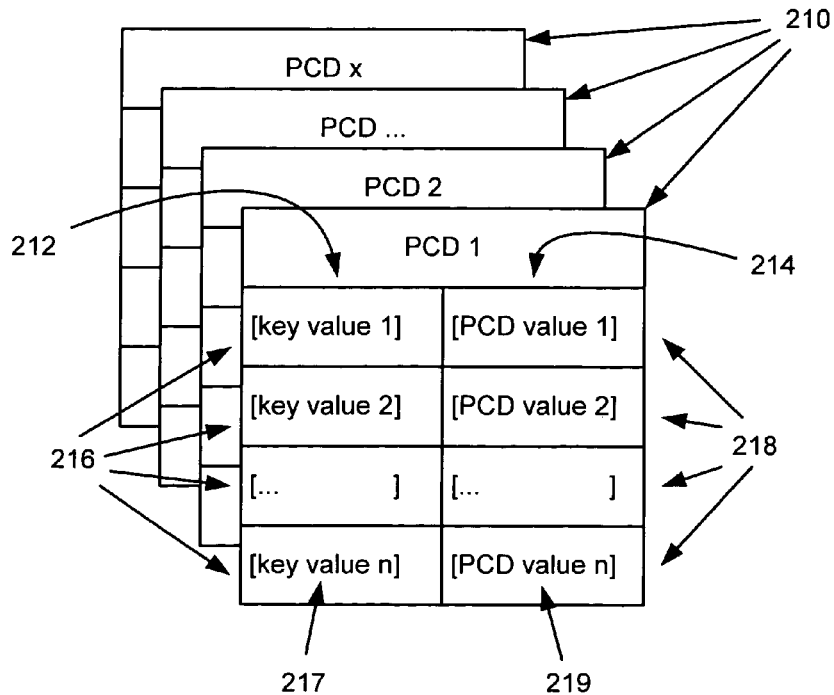
FIG. 13 illustrates one embodiment of several PCD tables in an FSO system.

FIG. 13—One Embodiment of Several PCD Tables in an FSO System

FIG. 13 illustrates one embodiment of a plurality of PCD tables 210 in an FSO system database. PCD tables 210 may include cells 216 for storing user-defined key values 217 in one column 212 and cells 218 for storing user-defined PCD data values 218 in a second column 216. One row in each table may include one cell 216 for storing a user-defined key value 217 and one cell 218 for storing the user-defined PCD data value 219 associated with the key value. In this example, in PCD table 1, key values (1, 2, . . . , n) correlate to processing parameters (1, 2, . . . , n). A user-defined key value 217 may include one or more key element values. A user-defined PCD data value 219 may include one or more processing parameter values.

In one embodiment, cells 216 for storing key values 217 may be of a pre-configured fixed size that is identical for all PCD tables 210. In this embodiment, the fixed size of cells 216 may be pre-configured large enough to store key values 217 of the maximum size anticipated by the user of the system. In one embodiment, if the pre-configured size of cells 216 is not large enough, the PCD tables may be re-configured with a larger fixed size for cells 216.

PCD tables (1, 2, . . . , x) as illustrated in FIG. 13 may be used in an embodiment of a production FSO system to store user-defined processing parameters and their associated user-defined key values. A program running on the FSO system may require a particular processing parameter to process a customer account data set. The FSO system may determine which PCD table holds the processing parameter, use the key definition and search mask table for the PCD table to construct a processing key value, and use the processing key value to search the PCD table key values and locate the particular processing parameter that matches the processing key value for the customer account data set.

Figure 14:
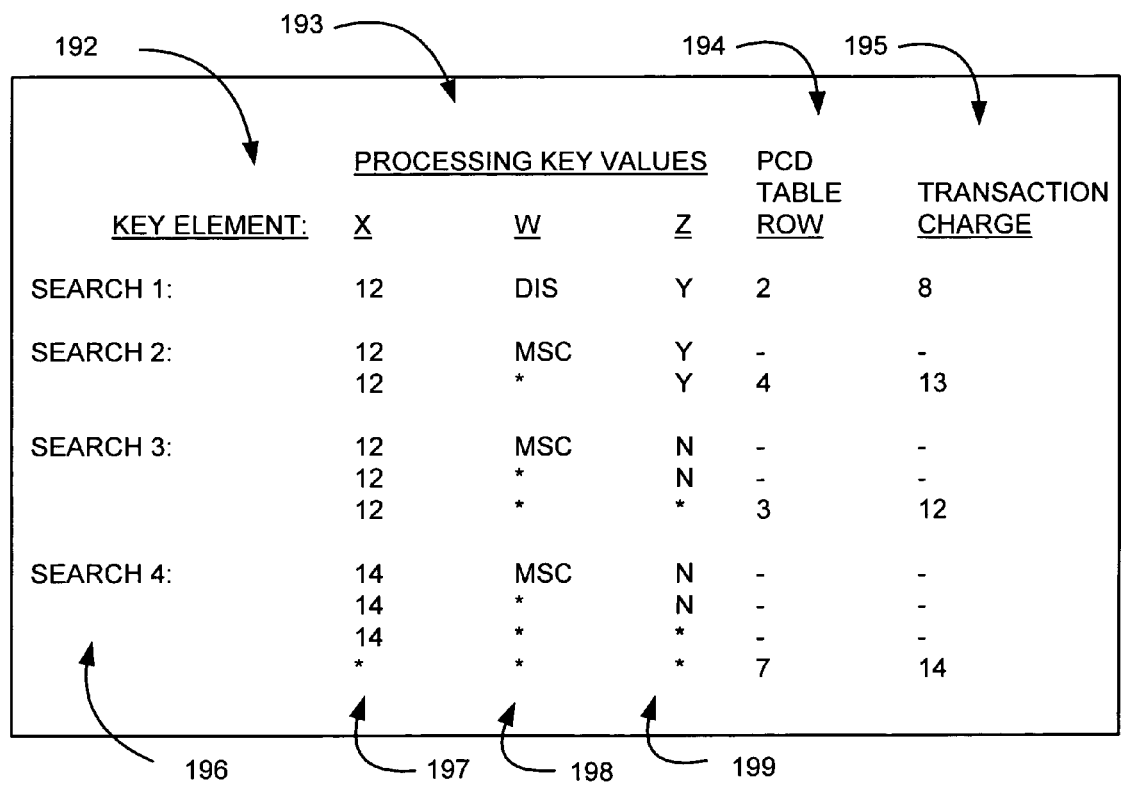
FIG. 14 illustrates examples of inputs to and results from one embodiment of a search process that may be applied to PCD tables as depicted in FIG. 8 using search mask tables as depicted in FIG. 9.

FIG. 14—Examples of Inputs to and Results from One Embodiment of a Search Process that May be Applied to PCD Tables as Depicted in FIG. 8 Using Search Mask Tables Such as the Search Mask Table Depicted in FIG. 9

FIG. 14 illustrates several examples of processing key value inputs to, and processing parameter outputs from, one embodiment of a PCD table search process as applied to PCD table 170 illustrated in FIG. 8, using key definition 150 illustrated in FIG. 7 and search mask table 180 illustrated in FIG. 9 to construct the processing key values. A PCD table search process may be initiated in response to a request for a processing parameter for use in processing a customer account data set in an FSO system.

In search 1, the PCD table search process uses key definition 150 and the first search mask in search mask table 180 to construct processing key values for a first customer account data set. In the first search mask, all mask values are set to the equal mask field value. A first processing key value is constructed using the first search mask. Key element X is set to the value 12 read from the customer account data set, key element W is set to the value DIS read from the customer account data set, and key element Z is set to the value Y read from the customer account data set. PCD table 170 is searched for the key value (12, DIS, Y). The key value for the second row in PCD table 170 matches the first processing key value. The search is completed when the match is found, and the corresponding processing parameter, 8, is returned to the requesting process in the FSO system.

In search 2, the PCD table search process uses key definition 150 and the first search mask in search mask table 180 to construct processing key values for a second customer account data set. A first processing key value is constructed using the first search mask. Key element X is set to the value 12 read from the customer account data set, key element W is set to the value MSC read from the customer account data set, and key element Z is set to the value Y read from the customer account data set. PCD table 170 is searched for the key value (12, MSC, Y). No exact match for the key value is found in PCD table 170. A second processing key value is constructed using the second search mask. Key element X is set to the value 12 read from the customer account data set, key element W is set to the wildcard key element value, and key element Z is set to the value Y read from the customer account data set. PCD table 170 is searched for the key value (12, *, Y). The key value for the fourth row in PCD table 170 matches the second processing key value. The search is completed when the match is found, and the corresponding processing parameter, 13, is returned to the requesting process in the FSO system.

In search 3, the PCD table search process uses key definition 150 and the first search mask in search mask table 180 to construct processing key values for a third customer account data set. A first processing key value is constructed using the first search mask. Key element X is set to the value 12 read from the customer account data set, key element W is set to the value MSC read from the customer account data set, and key element Z is set to the value N read from the customer account data set. PCD table 170 is searched for the key value (12, MSC, N). No exact match for the key value is found in PCD table 170. A second processing key value is constructed using the second search mask. Key element X is set to the value 12 read from the customer account data set, key element W is set to the wildcard key element value, and key element Z is set to the value N read from the customer account data set. PCD table 170 is searched for the key value (12, *, N). Again, no exact match for the key value is found in PCD table 170. A third processing key value is constructed using the third search mask. Key element X is set to the value 12 read from the customer account data set, key element W is set to the wildcard key element value, and key element Z is set to the wildcard key element value. PCD table 170 is searched for the key value (12, *, *). The key value for the third row in PCD table 170 matches the third processing key value. The search is completed when the match is found, and the corresponding processing parameter, 12, is returned to the requesting process in the FSO system.

In search 4, the PCD table search process uses key definition 150 and the first search mask in search mask table 180 to construct processing key values for a fourth customer account data set. A first processing key value is constructed using the first search mask. Key element X is set to the value 14 read from the customer account data set, key element W is set to the value MSC read from the customer account data set, and key element Z is set to the value N read from the customer account data set. PCD table 170 is searched for the key value (14, MSC, N). No exact match for the key value is found in PCD table 170. A second processing key value is constructed using the second search mask. Key element X is set to the value 14 read from the customer account data set, key element W is set to the wildcard key element value, and key element Z is set to the value N read from the customer account data set. PCD table 170 is searched for the key value (14, *, N). Again, no exact match for the key value is found in PCD table 170. A third processing key value is constructed using the third search mask. Key element X is set to the value 14 read from the customer account data set, key element W is set to the wildcard key element value, and key element Z is set to the wildcard key element value. PCD table 170 is searched for the key value (14, *, *). Again, no exact match for the key value is found in PCD table 170. A fourth processing key value is constructed using the fourth search mask. Key element X is set to the wildcard key element value, key element W is set to the wildcard key element value, and key element Z is set to the wildcard key element value. PCD table 170 is searched for the key value (*, *, *). The key value for the seventh row in PCD table 170 is set to all wildcard values, and thus matches the fourth processing key value. The search is completed when the match is found, and the corresponding processing parameter, 14, is returned to the requesting process in the FSO system.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A computer-implemented method comprising:
   storing a plurality of key definitions in a database table in a database of an Financial Service Organization (FSO) computer system, wherein the FSO computer system is configured to perform processing on FSO transaction-related data, wherein the key definitions in the database table are configured for use in processing FSO transaction-related data in the FSO computer system, wherein storing the plurality of key definitions in the database table comprises, for each of at least two rows in the database table:
   displaying two or more key element representations on a display screen in data communication with the Financial Service Organization (FSO) computer system;
   receiving a selection by a user of at least two key element representations from the two or more displayed key element representations;
   preparing a key definition from two or more key elements corresponding to the at least two selected key element representations in response to the user selecting the at least two key element representations;

storing the key definition in the database table, the key definition being configured for use in preparing a processing key value from transaction-related data in the FSO computer system, wherein the processing key value is configured for use in locating a process control data set in the database in the FSO computer system, the process control data set comprising one or more process control data values and configured for use in processing the transaction-related data in the FSO computer system;

defining by the user one or more key masks for the key definition, wherein each key mask comprises one or more mask fields, and wherein the one or more mask fields in the key mask correspond to one or more key elements in the key definition; and storing the one or more key masks in the database.

2. The method of claim 1, wherein receiving the selection by the user, preparing the key definition, and storing the key definition occur during a configuration of the FSO computer system.

3. The method of claim 1, wherein preparing the key definition from the two or more key elements further comprises the user specifying a sequence of the key elements in the key definition, wherein the user specifying a sequence of the key elements in the key definition comprises the user inputting one or more sequence parameters, at least one of one or more sequence parameters specifying the place of one of a selected key data element in a sequence of the selected key data elements for the key definition.

4. The method of claim 1, wherein the database comprises a plurality of data elements, and wherein the method further comprises:

selecting by the user a plurality of key elements for use in key definitions from the plurality of data elements; and selecting by the user one or more key elements for displaying on the display screen from the plurality of key elements.

5. The method of claim 1, further comprising:

defining by the user one or more key values for the key definition;

defining by the user a processing parameter value for each of the key values for the key definition; and storing the one or more key values and the processing parameter values in the database; and locating one of the processing parameter values, wherein locating one of the processing parameter values comprises matching a constructed processing key value with one of the one or more key values stored in the database.

6. The method of claim 5, wherein each of the one or more key values is unique among the one or more key values for the key definition.

7. The method of claim 5, wherein the database comprises a process control data table associated with the key definition, wherein the process control data table comprises one or more rows, and wherein each row in the process control data table comprises one or more fields for storing one key value and one or more fields for storing the processing parameter value for the key value stored in the row.

8. The method of claim 5, wherein each of the one or more key values comprises one key element value for each of the one or more key elements in the key definition, and wherein defining by the user the one or more key values for the key definition further comprises defining by the user the one or more key element values for each of the one or more key values.

9. The method of claim 8, wherein the user defining the one or more key element values for each of the one or more key values comprises the user selecting a key element value for each of the one or more key elements in the key definition from a plurality of available key element values for the key element.

10. The method of claim 9, wherein the plurality of available key element values comprises a wildcard key element value.

11. The method of claim 1, wherein the database is relational or is object-oriented.

12. The method of claim 1, wherein the transaction-related data comprises a credit card transaction, and wherein the processing parameter value comprises one or more data values configured for processing the credit card transaction.

13. A computer-implemented method comprising:

storing a plurality of key definitions in a database table in a database of an Financial Service Organization (FSO) computer system, wherein the FSO computer system is configured to perform processing on FSO transaction-related data, wherein the key definitions in the database table are configured for use in processing FSO transaction-related data in the FSO computer system, wherein storing the plurality of key definitions in the database table comprises, for each of at least two rows in the database table:

displaying two or more key element representations on a display screen in data communication with the Financial Service Organization (FSO) computer system;

receiving a selection by a user of at least two key element representations from the two or more displayed key element representations;

preparing a key definition from two or more key elements corresponding to the at least two selected key element representations in response to the user selecting the at least two key element representations;

storing the key definition in the database table, the key definition being configured for use in preparing a processing key value from transaction-related data in the FSO computer system, wherein the processing key value is configured for use in locating a process control data set in the database in the FSO computer system, the process control data set comprising one or more process control data values and configured for use in processing the transaction-related data in the FSO computer system; and defining by the user one or more key masks for the key definition, wherein defining by the user the one or more key masks comprises the user selecting a mask field value from a plurality of mask field values for each of one or more mask fields in each of the one or more key masks, and wherein the plurality of mask field values comprises an equal mask field value and a wildcard mask field value, wherein the database is relational or is object-oriented.

14. The method of claim 13, wherein the processing parameter value comprises one or more merchant transaction pricing values.

* * * * *